United States Patent
Roepke et al.

[11] 3,908,977
[45] Sept. 30, 1975

[54] ULTRAHIGH VACUUM MOUNTING FIXTURE

[75] Inventors: Wallace W. Roepke, Excelsior; Alexander I. Grabowski, Minneapolis, both of Minn.

[73] Assignee: The United States of America as represented by the Secretary of the Interior, Washington, D.C.

[22] Filed: Apr. 3, 1974

[21] Appl. No.: 457,667

[52] U.S. Cl. ............... 269/287; 85/74; 248/205 R; 248/226 R; 269/100; 403/290
[51] Int. Cl.² ................ B23Q 3/02; F16M 13/00
[58] Field of Search ........... 248/205 R, 226 R, 216; 85/73, 74, 86; 403/290; 269/100, 101, 287

[56] References Cited
UNITED STATES PATENTS

| 720,658 | 2/1903 | Bobo | 403/290 |
| 1,106,909 | 8/1914 | Zifferer | 248/205 R |
| 1,379,784 | 5/1921 | Schwartz | 403/290 |
| 3,626,803 | 12/1971 | Liebig | 85/74 |
| 3,721,463 | 3/1973 | Attwood et al. | 248/226 R |

FOREIGN PATENTS OR APPLICATIONS

| 1,011,517 | 7/1957 | Germany | 248/205 R |
| 666,964 | 2/1952 | United Kingdom | 85/73 |
| 725,847 | 11/1966 | Italy | 85/74 |

*Primary Examiner*—Richard E. Aegerter
*Assistant Examiner*—Richard R. Stearns
*Attorney, Agent, or Firm*—Thomas Zack; Donald R. Fraser

[57] ABSTRACT

A universal ultrahigh vacuum mounting fixture. The device is an expansion fitting specifically designed for ultrahigh vacuum (UHV) compatibility. A tapered plug has its front end inserted in a complementary shaped tapered hole in a sleeve. This sleeve has evenly spaced longitudinal slots that extend part of the way along and through the tapered surface. When in place, the sleeve extends through the wall of a vacuum chamber fitting into a vacuum flange mounting tube. A tightening bolt extends through the plug so that it may be turned from the rear of the plug pulling the plug into the sleeve to rigidly expand the sleeve inside the flange mounting rigidly fixing the plug and sleeve in the flange mounting tube. A variety of different types of mounting posts may be attached to the front end of the plug to protrude into the chamber and mount the device under observation. The complementary tapers of the plug and hole are usually different with the plug having a greater taper. Because of the ultrahigh vacuum environment of the chamber, it is essential that only ultrahigh vacuum compatible materials like 300 series stainless steel, be used in constructing the invention.

10 Claims, 9 Drawing Figures

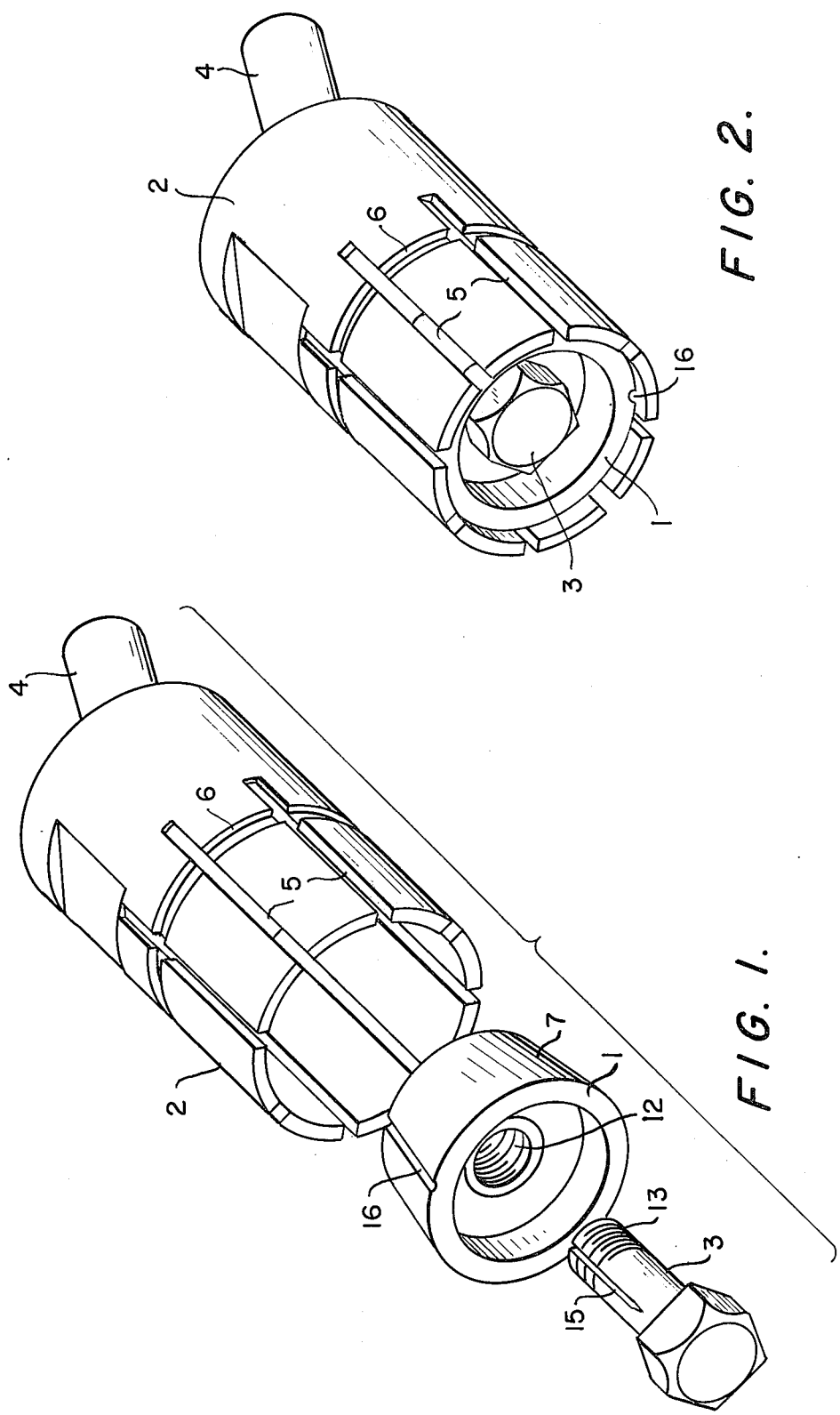

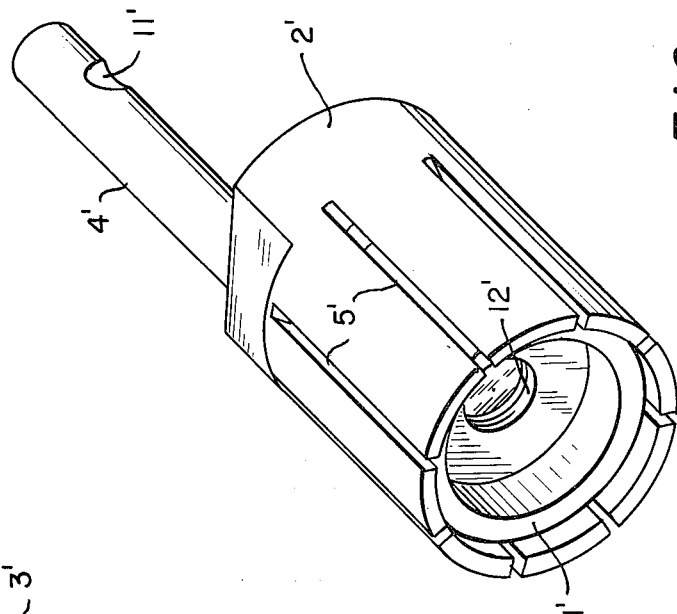
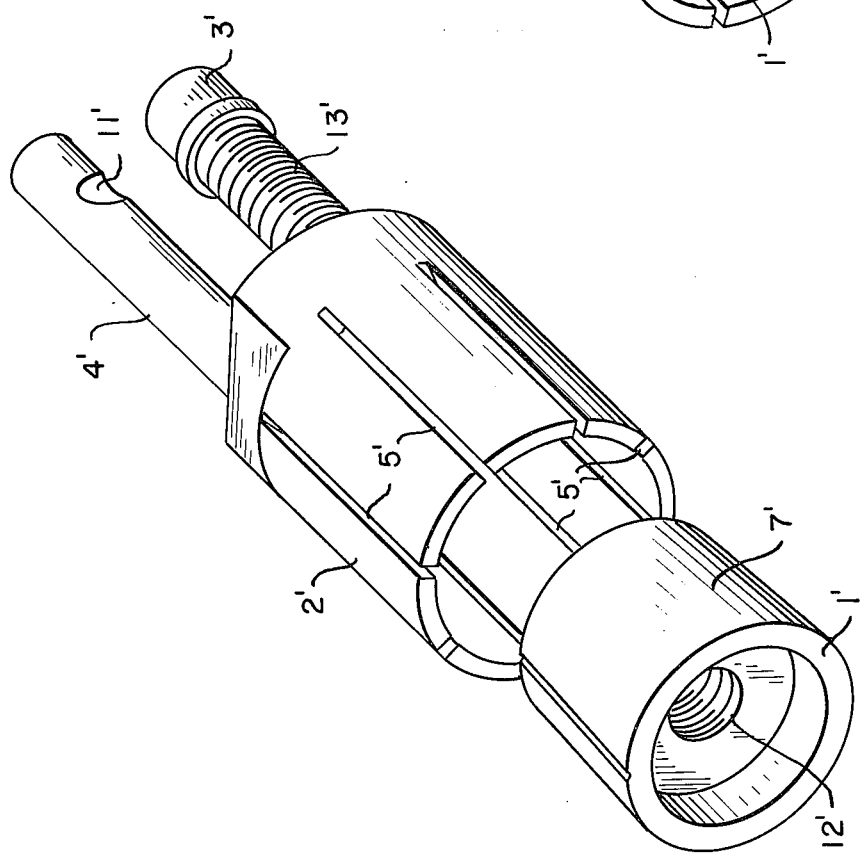

ULTRAHIGH VACUUM MOUNTING FIXTURE

BACKGROUND OF THE INVENTION

1. Field of the Invention

This invention relates to a mounting apparatus to mount devices in an ultrahigh vacuum chamber.

2. Description of Prior Art

Experiments conducted in ultrahigh vacuum systems have become increasingly important because such systems represent the type of natural environment found outside the earth such as in interplanetary space and on lunar surfaces. Here on earth, created ultrahigh vacuums are used in many types of manufacturing processes where ultralow gas pressure (ultrahigh vacuum, i.e., $10^{-9}$ to $10^{-12}$ torr) are required as in preparing micromodule circuits. Whatever the ultimate use, the need for experiments in ultrahigh vacuums is firmly established.

The ultrahigh vacuum (UHV) systems we have concentrated our efforts on are those whose gaseous pressure is less than $1 \times 10^{-9}$ torr. In contrast, a high vacuum (HV) system is one whose pressure is generally considered somewhere between about $1 \times 10^{-6}$ to $1 \times 10^{-9}$ torr. Because of the nature of the system we are operating in problems that would appear inconsequential in most high vacuum experiments become critical in ultrahigh vacuums. For example, since all plastics and most metals give off gases in UHV systems, and thereby affect the environment, the selection of materials used for the chambers and components within the chambers is extremely critical. Improper selection of materials can destroy the validity of any testing and/or seriously delay productivity. Further, because of the time required to create a true ultrahigh vacuum, it is essential that entrances to such chambers which mount the object of the experiment be of close tolerances and sealed absolutely while at the same time remain easy to use when aligning or positioning the object. None of the known prior art accomplishes the functions of our invention in the environment of interest. However, the prior art does show it is old to use a tapered plug that fits into a tapered slotted hole and to hold these two members together by tightening a bolt in the plug. One such example is the patent 720,658 to S. Bobo wherein a bicycle seat post is held by such a device. The distinctions between these types of mounting devices and our invention is more than the operative environment or the functions to be performed. There are also important structural distinctions, all of which will become more apparent by reading this disclosure.

SUMMARY OF THE INVENTION

The invention described in this specification is a universal mounting assembly for use with an ultrahigh vacuum chamber. This assembly consists of a tapered plug with longitudinal slots that fit into the hollow end of a complementary shaped sleeve assembly, the whole unit being mounted rigidly within a flange mounting tube by tightening the plug within the sleeve. A mounting post is fastened to the sleeve's other end to hold the device that is under observation in the chamber.

The primary object of this invention is an improved mount for fixtures used in an ultrahigh vacuum environment.

FIG. 1 illustrates the preferred embodiment of our invention in an exploded view.

FIG. 2 shows the preferred embodiment in its assembled condition.

FIG. 5 is an exploded view of another embodiment of our invention.

FIG. 6 shows the FIG. 5 embodiment in an assembled state.

Figure 3:
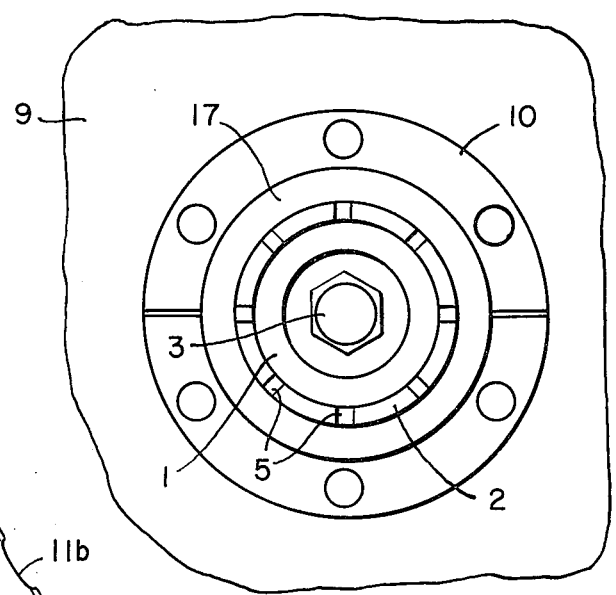
FIG. 3 is the assembled mounting of FIG. 2 in place in an ultrahigh vacuum chamber with the UHV tight cover cap removed for clarity.

The preferred embodiment of our mounting fixture may be described as consisting of four major parts. These parts, shown in FIG. 1, are the tapered plug assembly 1, the tapered sleeve assembly 2, the threaded bolt 3, and the mounting post 4. Variations are possible in the construction of each of these parts with the greatest variations being possible in the post 4 and tightening bolt 3. The plug and sleeve assembly are complementary shaped so that the male plug is easily inserted within the hollow open end of the sleeve when the bolt is untightened. Usually the angle of the taper for the plug is greater than that of the taper of the interior wall of the sleeve to allow easy removal.

The sleeve is hollow at its front end and has a series of elongated parallel slots 5 that extend through the sleeve wall. These slots begin at the hollow end and terminate slightly rearward of an intersecting second slot 6. This second slot or groove encircles the sleeve's diameter but does not extend through the wall of the sleeve. The circumferential slot allows the sleeve to flex while still providing the desired structural rigidity. By intersecting the slots the sleeve sections between slots 5 can flex when plug 1 has its outer tapered surface 7 engaging the inner wall of the sleeve. The mounting post 4 that is screw threaded to the solid other end (or rear) of sleeve 2 will be described in more detail with respect to FIG. 4.

The plug 1 has a tapered surface 7 that angles at about 25° from the plug's horizontal centerline with converging taking place towards the front end of the plug. The larger cross sectional area of the plug, shown in FIG. 1, has a threaded hole 12 which receives the threads 13 of the bolt 3. By this construction the plug can expand slightly when the bolt is inserted in hole 12 and tightened. Tightening of the bolt causes the inwardly tapered sleeve sections between slots 5 to flex and expand slightly outwardly thus insuring a very tight fit between the sleeve and inside wall of the flange mounting tube on the chamber.

Figure 7:
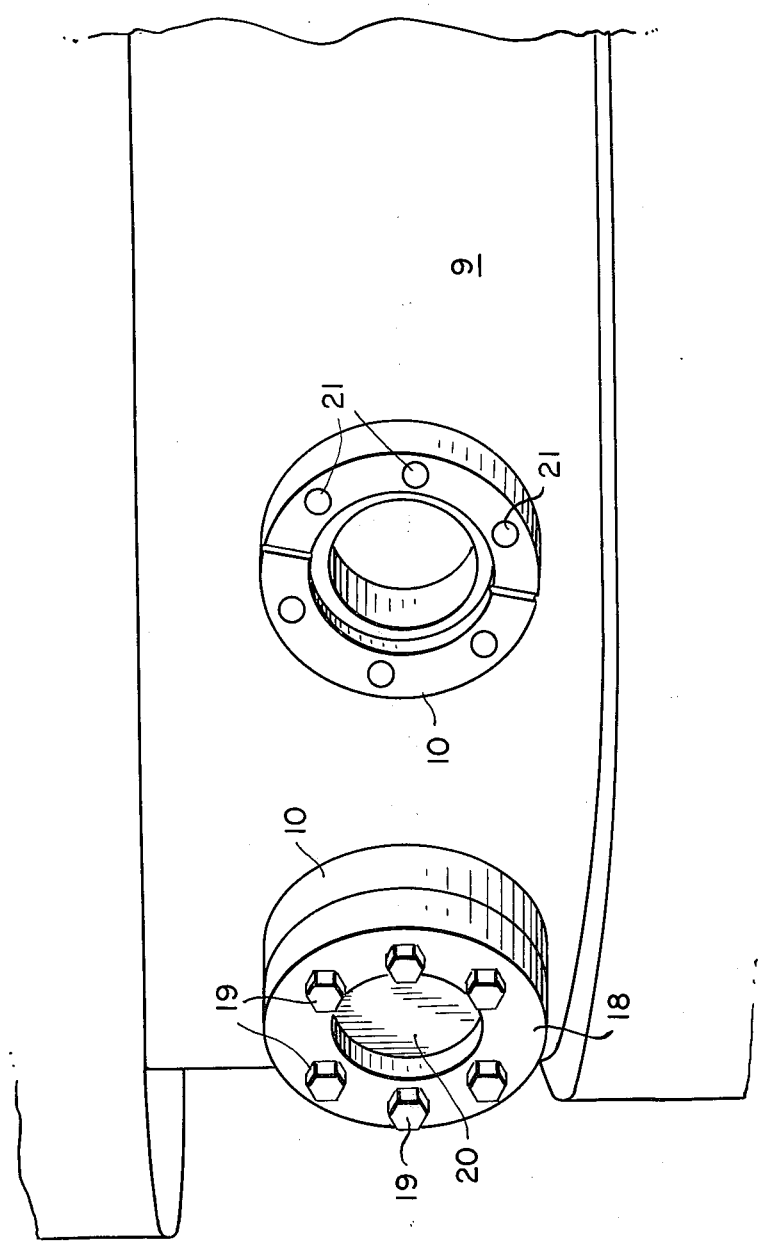
FIG. 7 shows the ultrahigh vacuum chamber with an open flange mounting tube (UHV cover cap removed for clarity), and to the left a similar unit with UHV cover cap in place.

FIG. 2 shows the bolt, plug, and sleeve of FIG. 1 in its assembled state. FIG. 3 illustrates the same assembly in place within an aperture of the ultrahigh vacuum chamber 9. The chamber aperture has an outer metal collar 10 that is fixed to the chamber and surrounds the aperture. Before final chamber sealing, access to tighten the bolt 3 is easily accomplished from outside the chamber. FIG. 7 shows a similar aperture before mounting the assembly. To the left of the FIG. 7 mounting fixture is another aperture with the outer UHV cover cap in place.

When an ultrahigh vacuum system is discussed we are referring to an artifically created system with an environment whose gaseous pressure is below $1 \times 10^{-9}$ torr. In such a system, the materials that experimental apparatus are constructed of are very important since most materials give off trapped gases that could alter the gas pressure in the environment. Another major problem encountered in attempting to create and maintain an ultrahigh vacuum chamber, is to keep the water vapor out since even minute amounts evaporate almost instantly to form vapor which then contaminates the system or will alter the gaseous pressure.

Of the materials tried plastics and most metals proved unsatisfactory because of their tendency to give off excess gas in an ultrahigh vacuum environment and water vapor retention characteristics. The most satisfactory materials found for constructing the vacuum chamber and our invention are stainless steel of the 300 series especially series 304, 306, or 316. Other materials that could conceivably be used include a hard glass material like a hard ceramic.

Another problem which presents itself is that of degassing trapped gases from the chamber. To remove such gases by use of the UHV pumps several conduits are provided. First, there are the eight evenly spaced peripheral slots 5, already mentioned, through the wall of the sleeve. Secondly, on the plug's surface 7 there is also a longitudinal slot 16 (see FIGS. 1 and 2) that extends along the entire length of the plug. Thirdly, there is an elongated slot 15 (FIG. 1) on the bolt 3 that cuts into its threads 13. The number of slots 5 is somewhat arbitrary but the larger the number the better the degassing will occur. Eight slots have been selected as a balance or "trade off" between the degassing desired and the strength of the material involved.

Figure 4A:
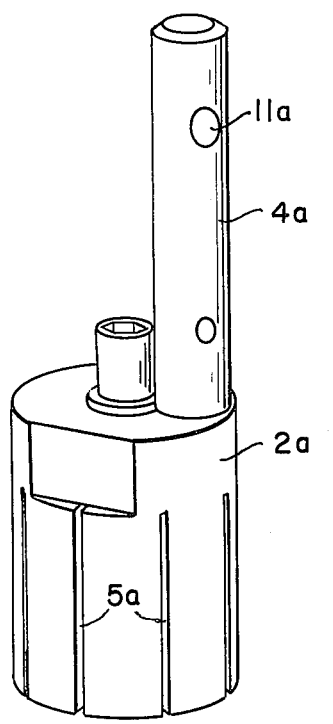
FIGS. 4a, 4b and 4c show three different types of mounting fixtures usable with our invention.
Figure 4B:
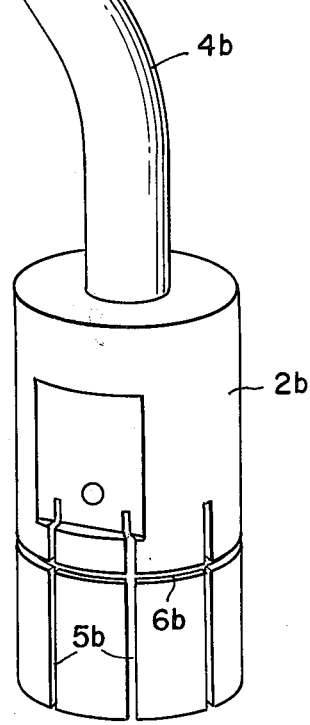
Figure 4C:
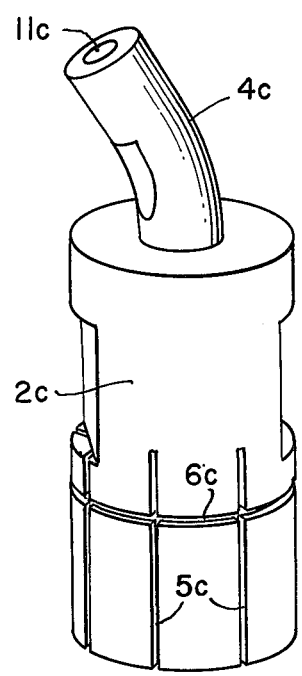

FIG. 4 shows the tapered sleeve and several types of mounting posts. It is divided into three sections (a), (b), and (c) for ease of explanation. Each uses the same number with subscripts a, b, or c being used to represent the same parts shown in FIG. 1, i.e., the sleeve in (a) is designated by 2a, the post by 4a, etc., and the sleeve in (b) by 2b, etc. The reason FIG. 4 was chosen is to show three of the almost infinite possible types of mounting posts that could be used. Post 4a is screwed flush into the solid back of sleeve 2a and has a hole 11a used to mount whatever device is being observed in the vacuum chamber. In one experiment concerning testing of drills for drilling on a lunar surface, the device mounted was a drill system. In (b) the post 4b is at an acute angle to the sleeve's centerline with a mounting hole 11b near its end. The FIG. 4c embodiment shows still another type of short bent post 4c bent like 4b but with the mounting hole 11c being a threaded hole at the end surface of the post. A similarly threaded bolt member, on the device under observation in the chamber, would screw into hole 11c of the post to fasten it to the post.

FIG. 5 and FIG. 6 represent a somewhat different alternate embodiment of the preferred embodiment shown in FIGS. 1 and 2. This alternate uses the same numbers as FIG. 1 to represent common parts with primes added. The major differences relate to the lesser taper of surface 7', the way bolt fastener 3' is inserted in the plug, and the absence of a circular slot like slot 6 of FIG. 1. The FIG. 5 bolt 3' is screwed into the smaller cross sectional area of plug 1' from the plug end facing towards the chamber and extends through a hole (not shown) in the rear of sleeve 2'. In this way, when the bolt is tightened the plug 1' is drawn to the sleeve (to the right in FIG. 5) resulting in the flexing and outward expanding of the sleeve walls. Because surface 7' is tapered only about 5° from the horizontal centerline of the plug, rather than 25° as in the FIG. 1 plug, better mating contact is obtained between surface 7' and the inner wall of the sleeve. However, to loosen these two parts tapping may be required. Unlike the preferred embodiment changes of alignment, positioning and locking of the experimental device connected to mounting post 4' can be made only from inside the chamber which requires removal of the chamber's upper top. This may also be a drawback when the size of the chamber is such that it is difficult to turn a wrench inside it.

Most ultrahigh vacuum chambers have standard sized apertures to allow access to the chamber interior. These feed-through apertures are made of 1.5 inch I.D. tubing extending out from the chamber wall with a sealing surface (FIG. 3) on the end and a flange for bolting the UHV cover cap down tightly over the gasket to compress it sufficiently. The gasket area is taken up by a gold, copper, or aluminum ring gasket 17 (see FIG. 3) that fits over the gasket seat. When a torque wrench tightens the bolt 3 using about 15–20 foot pounds (FIG. 1) the previously described sleeve expansion takes place to fasten the unit within this feedthrough aperture.

FIG. 7 shows the ultrahigh vacuum chamber 9 with our invention sealed and also with our invention omitted entirely. The left port into the chamber having our invention is covered by an annular ring 18 that is held by six bolts 19 to collar 10. A seal 20 having the same sealing configuration on its periphery as 17 (FIG. 7) is interposed between the ring 18 and collar 10 to seal the evacuated chamber from the ambient gases. Not visible but interposed between the seal 20 and sealing surface of gasket 17 is an annular ring of copper which when compressed comprises the UHV seal. The right hand port shows the chamber minus our invention and the ring 18, seal 20, and bolts 19. Chamber bolt holes 21 receive the tightening bolts 19 to provide the sealing tightness needed.

Once sealed with the experimental device positioned it now remains to create the ultrahigh vacuum desired. Generally, three pump types are used to evacuate down the system. The first type like, a small rotary pump of ½ cfm, pumps for about 2 hours until the pressure falls below 100 torr. Then a liquid nitrogen cooled absorption pump further reduces the pressure below $5 \times 10^{-3}$ torr during the next 2 hours. Then a more sophisticated electronic or ion pump further reduces the pressure until the desired ultrahigh vacuum pressure is reached. This ion pump has several sections, each of which has an emitter and collector plate. When a high voltage is applied to the emitter, electrons leave its plate surface and travel to the collector plate. Between plates they strike molecules of gas and cause them to become ionized. These ionized molecules are then collected electrostatically. The final pump down time is entirely dependent upon the materials within the chamber but will average 48 hours for a final pressure less than $8 \times 10^{-10}$ torr.

It is thus seen that we have created a simplified ultrahigh vacuum mounting fixture which is usable with many different types of mounting posts. The variety of experiments that can be conducted is virtually limitless being only restricted by the size of the chamber. None of the specifically disclosed uses or physical embodiments described should be used to limit the scope and extent of our invention which is to be measured only by the claims that follow.

We claim:

1. A mounting assembly for use with an ultrahigh vacuum chamber comprising:
   an elongated hollow open ended tapered sleeve with a plurality of spaced longitudinal slots extending from the hollow open end to part way up the sleeve;
   a tapered plug having means for receiving a tightening member insertable within the hollow open end of said sleeve;
   a tightening member insertable in said plug's means for receiving a tightening member for expanding said plug upon tightening and for retaining the plug within the sleeve;
   said tightening member having means for allowing the escape of gas trapped by said plug and tightening member in said ultrahigh vacuum chamber as said member is tightened; and
   a mounting post fastened to the end of the sleeve opposite its hollow open end for mounting a device in a chamber.

2. The assembly of claim 1 wherein said tightening member is inserted in the plug end having the largest cross sectional area.

3. The assembly of claim 2 wherein both said plug and tightening member have gas passageways to assist in degassing the assembled unit.

4. The assembly of claim 3 wherein said longitudinal slots are parallel and equally spaced from each other around the sleeve and intersect a groove extending partially through and around the sleeve.

5. The assembly of claim 3 wherein said plug, sleeve and tightening member are made substantially of material from the 300 series of stainless steel.

6. The assembly of claim 3 wherein said tightening member is a threaded bolt and its gas passageway used to assist the degassing the assembled unit is a longitudinal slot that intersects said bolt threads.

7. The assembly of claim 1 wherein said tightening member is inserted in the plug end having the smaller cross sectional area.

8. The assembly of claim 1 wherein the tapers on the plug and sleeve are substantially complementarily shaped with the plug taper being greater than that of the sleeve.

9. The assembly of claim 8 wherein said post is bent along its length to form an acute angle with the longitudinal centerline of the sleeve.

10. The assembly of claim 1 wherein said mounting post is made substantially from stainless steel and has an aperture to mount the device.

* * * * *